(12) United States Patent
Kang (10) Patent No.: US 7,725,915 B2
(45) Date of Patent: May 25, 2010

(54) CHANNEL CHANGING METHOD IN DIGITAL BROADCASTING SERVICE

(75) Inventor: Seung-Mi Kang, Yongin-shi (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1448 days.

(21) Appl. No.: 10/395,110

(22) Filed: Mar. 25, 2003

(65) Prior Publication Data

US 2003/0200551 A1    Oct. 23, 2003

(30) Foreign Application Priority Data

Apr. 18, 2002    (KR)   ............................... 2002-21217

(51) Int. Cl.
| | |
|---|---|
| H04N 7/173 | (2006.01) |
| H04N 7/10 | (2006.01) |
| H04N 7/025 | (2006.01) |
| G06F 3/00 | (2006.01) |
| G06F 13/00 | (2006.01) |

(52) U.S. Cl. .......................... 725/120; 725/38; 725/98; 709/250

(58) Field of Classification Search .................. 725/38, 725/120, 98; 709/250
See application file for complete search history.

(56) References Cited

U.S. PATENT DOCUMENTS

| | | | |
|---|---|---|---|
| 5,550,578 | A | 8/1996 | Hoarty et al. |
| 5,734,589 | A | 3/1998 | Kostreski et al. |
| 5,805,591 | A | 9/1998 | Naboulsi et al. |
| 6,219,355 | B1 | 4/2001 | Brodigan |
| 6,317,884 | B1 | 11/2001 | Eames et al. |
| 6,473,427 | B1 | 10/2002 | Brodigan |
| 6,519,009 | B1 * | 2/2003 | Hanaya et al. ............... 348/564 |
| 6,728,965 | B1 * | 4/2004 | Mao ............................ 725/38 |
| 6,970,461 | B2 * | 11/2005 | Unitt et al. ................... 370/390 |
| 7,010,801 | B1 * | 3/2006 | Jerding et al. ................ 725/95 |
| 7,203,953 | B2 * | 4/2007 | Mao et al. .................... 725/109 |
| 7,296,091 | B1 * | 11/2007 | Dutta et al. .................. 709/245 |
| 7,305,697 | B2 * | 12/2007 | Alao et al. ................... 725/114 |
| 7,359,332 | B2 * | 4/2008 | Kolze et al. .................. 370/252 |
| 2002/0171670 | A1 * | 11/2002 | Clernock et al. ............. 345/629 |
| 2003/0169724 | A1 * | 9/2003 | Mehta et al. ................. 370/352 |

FOREIGN PATENT DOCUMENTS

| | | | |
|---|---|---|---|
| DE | | 0 633 694 A1 * | 11/1995 |
| KR | 10-2001-0011089 | | 2/2001 |

OTHER PUBLICATIONS

*Search/Examination report* from the Korean Patent Office issued in Applicant's corresponding Korean Patent Application No. 10-2002-0021217 dated Mar. 16, 2004 and the Request for Entry of the Accompanying Document.

* cited by examiner

*Primary Examiner*—John W. Miller
*Assistant Examiner*—John Schnurr
(74) *Attorney, Agent, or Firm*—H.C. Park & Associates, PLC

(57) ABSTRACT

Disclosed is a channel changing method in a digital broadcasting service. According to the channel changing method, a subscriber device provided with a channel change protocol that operates on a TCP/IP layer transmits an input channel change message through the channel change protocol, and a channel change server that received the channel change message receives a confirmation message that includes channel information according to channel change information included in the channel change message, and transmits data of a requested channel to the subscriber device.

24 Claims, 3 Drawing Sheets

DSM-CC SESSION CONTROL PROTOCOL STACK

DSM-CC CHANNEL CHANGE PROTOCOL STACK

CHANNEL CHANGING METHOD IN DIGITAL BROADCASTING SERVICE

CLAIM OF PRIORITY

This application makes reference to, incorporates the same herein, and claims all benefits accruing under 35 U.S.C. §119 from my application METHOD FOR CHANGING THE CHANNEL OF DIGITAL BROADCASTING SERVICE filed with the Korean Industrial Property Office on Apr. 18, 2002 and there duly assigned Ser. No. 21217/2002.

BACKGROUND OF THE INVENTION

1. Technical Field

The present invention relates to a digital broadcasting service, and more particularly to a channel changing method when using a digital broadcasting service.

2. Related Art

Broadcasting on demand (BOD) is an example of a digital broadcasting service. The broadcasting on demand (BOD) currently represented by video on demand (VOD) is a service that provides in real time video information requested by a user. The broadcasting on demand (BOD) is not a unidirectional service that one-sidedly receives programs of the existing public network broadcasts or through a cable television (TV), but is a bi-directional service that can use desired contents at a desired time according to a subscriber's request. An infrastructure for providing the broadcasting on demand (BOD) requires a state in which a video database has been constructed, and the database has been connected to a home (or personal portable terminal) through a wideband transmission path (that is, cable or wireless path).

A set top box can be referred to as an interface unit, a set top box unit, a home user terminal, a home terminal, and other terms. The set top box can correspond to a device able to perform various functions. For example, a set top box can support Internet access through a television, and can provide users with high-speed access to the Internet via a cable modem or broadband network rather than the traditional telephone network plain old telephone services (POTS). In addition, a set top box can provide video-conferencing capabilities, can support community networking, and can provide media-on-demand (MOD) capabilities including video-on-demand, music-on-demand, news-on-demand, impulse-pay-per-view, and television-programs-on-demand. A set top box is often located at a remote user location enabling the user to transmit information signals such as requests, instructions, or other data. A set top box can include a central processing unit.

In order for a set top box unit (STU) to be provided with a broadcasting on demand (BOD) service and to select a channel from multiple video channels, a standard for defining a control message between a network and a subscriber's device is required. Such a standard is digital storage media-command and control (DSM-CC) defined in 13818-6 originated from International Standards Organization/International Electrotechnical Commission (ISO/IEC). The digital storage media-command and control (DSM-CC) has been designed to support services of video on demand (VOD) and other services in an asynchronous transfer mode (ATM) network. The digital storage media-command and control (DSM-CC) transmits broadcasting programs only to a replication unit and broadcast control unit (RU/BCU) in a transfer network such as a hybrid fiber coax (HFC) or fiber to the curb (FTTC) and the replication unit and broadcast control unit (RU/BCU) multicasts the broadcasting programs to the set top box unit.

The replication unit and broadcast control unit (RU/BCU) is different from a zapper server. A zapper server can be referred to as a channel change protocol (CCP) server. All broadcasting programs are transferred up to the channel change protocol (CCP) server, but are not transferred up to the set top box unit.

The digital storage media-command and control (DSM-CC) is classified into a session control protocol and a channel change protocol for controlling channel change after service connection. The session control protocol and the channel change protocol operate on different protocol stacks.

In the digital storage media-command and control (DSM-CC), the session control protocol is defined based on a transmission control protocol/Internet protocol (TCP/IP) protocol, and the channel change protocol is defined based on an AAL5/ATM protocol. ATM is asynchronous transfer mode. AAL5 is asynchronous transfer mode adaption layer 5.

According to the digital storage media-command and control (DSM-CC) standard, in a case where the service environment can support the asynchronous transfer mode (ATM), the technical implementation of digital storage media-command and control (DSM-CC) is possible. But in a case where the service environment cannot support the asynchronous transfer mode (ATM), and can only support the transmission control protocol/Internet protocol (TCP/IP), the technical implementation of the digital storage media-command and control (DSM-CC) is difficult.

Since the session control protocol and the channel change protocol should be implemented on the different protocol stacks, an additional manipulation or conversion is required in order to have compatibility between those two protocols. A message that is transmitted through the channel change protocol must be received at a first destination and then manipulated or converted, so that the contents of that message can then be transmitted to a second destination through the session control protocol.

The repeated changing of TCP/IP packets to ATM packets, and the repeated changing of ATM packets to TCP/IP packets would be necessary in that arrangement. The set top box unit that is the subject of requesting of the channel change, for the most part, has no asynchronous transfer mode (ATM) adaptation layer (AAL) mounted thereon, and it is necessary to develop a modified technique.

The digital storage media-command and control (DSM-CC) standard defines a session resource manager (SRM) that is a terminating set between the server and the set top box unit. The session resource manager (SRM) converts messages that are transmitted through the session control protocol to become messages to be transmitted through the channel change protocol. The session resource manager (SRM) converts messages that are transmitted through the channel change protocol to become messages to be transmitted through the session control protocol. The channel change protocol and the session control protocol operate on different protocol stacks.

If the digital storage media-command and control (DSM-CC) standard is applied without modification, it causes inconvenience and inefficiency such as putting the session onto the Internet protocol (IP), the sending of the channel on the asynchronous transfer mode adaption layer 5 and then on the Internet protocol network in a network interface unit (NIU), and the sending of a confirmation message in reverse order.

It is my observation that there is currently a lack of convenient and efficient methods supporting channel changing in digital broadcasting services. Efforts have been made to improve features related to networking and broadcasting services.

Exemplars of recent efforts related to networking and broadcasting services are disclosed, for example, in U.S. Pat. No. 5,550,578 to Hoarty et al., entitled INTERACTIVE AND CONVENTIONAL TELEVISION INFORMATION SYSTEM, issued on Aug. 27, 1996, U.S. Pat. No. 5,805,591 to Naboulsi et al., entitled SUBSCRIBER NETWORK INTERFACE, issued on Sep. 8, 1998, U.S. Pat. No. 6,219,355 to Brodigan, entitled VIDEO AND DATA COMMUNICATION SYSTEM, issued on Apr. 17, 2001, U.S. Pat. No. 5,734,589 to Kostreski et al., entitled DIGITAL ENTERTAINMENT TERMINAL WITH CHANNEL MAPPING, issued on Mar. 31, 1998, U.S. Pat. No. 6,317,884 to Eames et al., entitled VIDEO, DATA AND TELEPHONY GATEWAY, issued on Nov. 13, 2001, and U.S. Pat. No. 6,473,427 to Brodigan, entitled ATM BASED VDSL COMMUNICATION SYSTEM HAVING META SIGNALING FOR SWITCHING A SUBSCRIBER BETWEEN DIFFERENT DATA SERVICE PROVIDERS, issued on Oct. 29, 2002.

While these contemporary efforts contain merit, it is my observation that further improvements can be contemplated.

SUMMARY OF THE INVENTION

Accordingly, the present invention provides a solution to the above-mentioned problems. The present invention provides a method capable of transmitting a session control protocol and a channel change protocol through the same protocol stack in a digital broadcasting service.

The present invention provides a channel changing method in a digital broadcasting service using a transmission control protocol/Internet protocol (TCP/IP) network.

The present invention provides a channel changing method in a digital broadcasting service, comprising the steps of a subscriber device provided with a channel change protocol that operates on a transmission control protocol/Internet protocol (TCP/IP) layer transmitting an input channel change message through the channel change protocol, a channel change server that received the channel change message receiving a confirmation message that includes channel information according to channel change information included in the channel change message, and transmitting data of a requested channel to the subscriber device.

In accordance with the principles of the present invention, as embodied and broadly described, the present invention provides an apparatus for changing channels in a digital broadcasting service, the apparatus comprising: a set top box unit being provided with a channel change protocol executed in a transmission control protocol/Internet protocol (TCP/IP) layer, said set top box unit transmitting a channel change request message through the channel change protocol, the channel change request message requesting data of a new channel; and a channel change server receiving the channel change request message through the channel change protocol, transmitting a channel change confirmation message through the channel change protocol in response to the received channel change request message, said set top box unit receiving the channel change confirmation message from said channel change server through the channel change protocol, said channel change server transmitting the data of the new channel to said set top box unit through the channel change protocol.

In accordance with the principles of the present invention, as embodied and broadly described, the present invention provides a method for changing channels in a digital broadcasting service, the method comprising: transmitting a channel change request message from a set top box unit to a channel change server through a channel change protocol, the channel change protocol being executed in a transmission control protocol/Internet protocol (TCP/IP) layer, the channel change request message requesting data of a new channel; receiving the channel change request message at the channel change server through the channel change protocol; transmitting a channel change confirmation message from the channel change server to the set top box unit in response to the received channel change request message; and transmitting the requested data of the new channel from the channel change server.

In accordance with the principles of the present invention, as embodied and broadly described, the present invention provides a method for changing channels in a digital broadcasting service, the method comprising: transmitting a channel change request message from an interface unit to a server through a channel change protocol, the channel change protocol being executed in a transmission control protocol/Internet protocol (TCP/IP) layer, the channel change request message requesting data of a different channel; receiving the channel change request message at the server through the channel change protocol; transmitting a channel change confirmation message from the server to the interface unit through the channel change protocol in response to the received channel change request message; and transmitting the requested data of the different channel from the server to the interface unit through the channel change protocol, the requested data of the different channel transmitted from the server including at least one selected from among digital video data and digital audio data.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DESCRIPTION OF EMBODIMENTS FOR CARRYING OUT THE INVENTION

While the present invention will be described more fully hereinafter with reference to the accompanying drawings, in which details of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Illustrative embodiments of the invention are described below. In the interest of clarity, not all features of an actual implementation are described. In the following description, well-known functions, constructions, and configurations are not described in detail since they could obscure the invention with unnecessary detail. It will be appreciated that in the development of any actual embodiment numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

Figure 1:
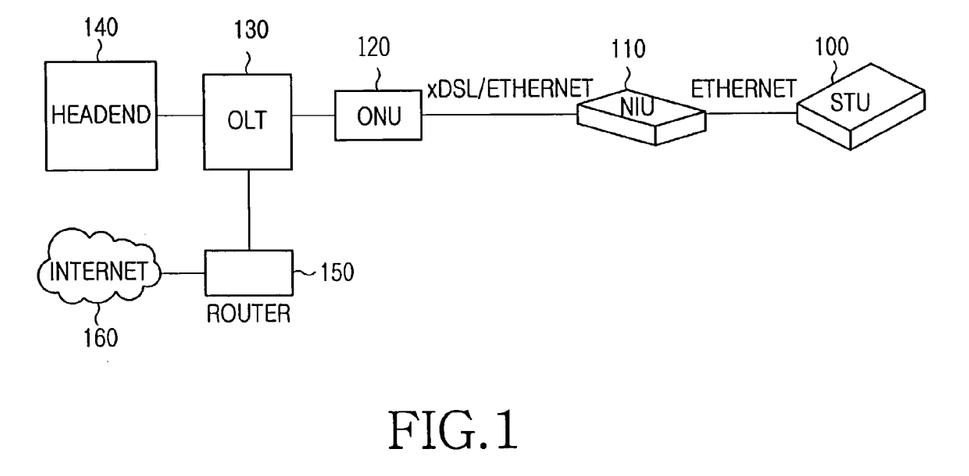
FIG. 1 is a view illustrating an exemplary construction for providing the digital broadcasting service.

Broadcasting on demand (BOD) is an example of a digital broadcasting service. The broadcasting on demand (BOD) currently represented by video on demand (VOD) is a service that provides in real time video information requested by a user. The broadcasting on demand (BOD) is not a unidirectional service that one-sidedly receives programs of the existing public network broadcasts or through a cable television (TV), but is a bidirectional service that can use desired contents at a desired time according to a subscriber's request. An infrastructure for providing the broadcasting on demand (BOD) requires a state in which a video database has been constructed, and the database has been connected to a home (or personal portable terminal) through a wideband transmission path (that is, cable or wireless path). FIG. 1 is a view illustrating an exemplary construction for providing the digital broadcasting service.

In order for a set top box unit (STU) to be provided with a broadcasting on demand (BOD) service and to select a channel from multiple video channels, a standard for defining a control message between a network and a subscriber's device is required. Such a standard is digital storage media-command and control (DSM-CC) defined in 13818-6 originated from International Standards Organization/International Electrotechnical Commission (ISO/IEC). The digital storage media-command and control (DSM-CC) has been designed to support services of video on demand (VOD) and other services in an asynchronous transfer mode (ATM) network. The digital storage media-command and control (DSM-CC) transmits broadcasting programs only to a replication unit and broadcast control unit (RU/BCU) in a transfer network such as a hybrid fiber coax (HFC) or fiber to the curb (FTTC), and the replication unit and broadcast control unit (RU/BCU) multicasts the broadcasting programs to the set top box unit.

The replication unit and broadcast control unit (RU/BCU) is different from a channel change protocol (CCP) server. The replication unit and broadcast control unit (RU/BCU) is a piece of equipment which can multi-cast a broadcast program received from a broadcast server (CCP server) to STU (CCP client). Here, the broadcast server is the CCP server, and the STU is the CCP client.

The broadcast program is transmitted only from the broadcast server to the RU/BCU, and is multi-casted from the RU/BCU according to a request of the STU. All broadcasting programs are transferred up to the channel change protocol (CCP) server, but are not transferred up to the set top box unit.

Figure 2:
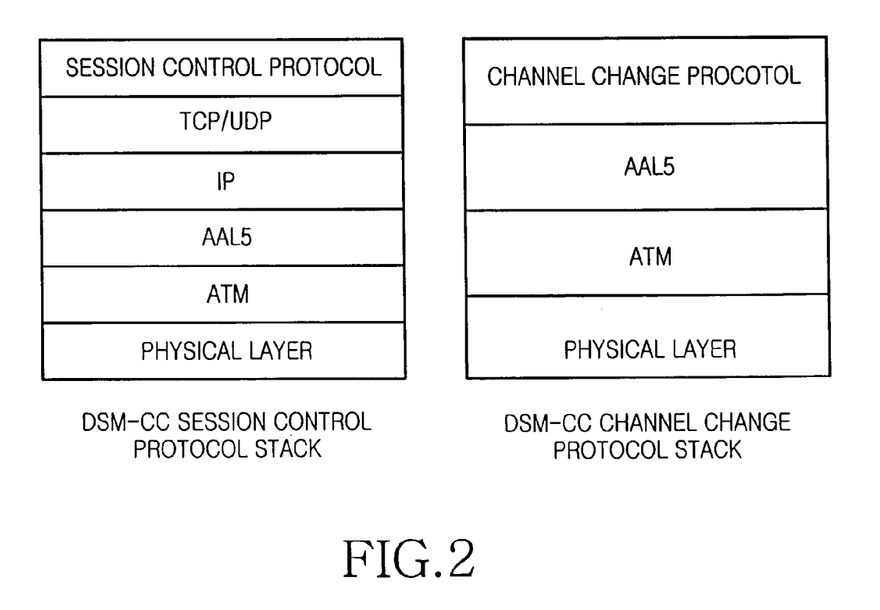
FIG. 2 is a view illustrating exemplary stacks of the session control protocol and the channel change protocol.

The digital storage media-command and control (DSM-CC) is classified into a session control protocol and a channel change protocol for controlling channel change after service connection. The session control protocol and the channel change protocol operate on different protocol stacks. FIG. 2 is a view illustrating exemplary stacks of the session control protocol and the channel change protocol.

In the digital storage media-command and control (DSM-CC), the session control protocol is defined based on a transmission control protocol/Internet protocol (TCP/IP) protocol, and the channel change protocol is defined based on an AAL5/ATM protocol. ATM is asynchronous transfer mode. AAL5 is asynchronous transfer mode adaption layer 5.

According to the digital storage media-command and control (DSM-CC) standard, in a case where the service environment can support the asynchronous transfer mode (ATM), the technical implementation of digital storage media-command and control (DSM-CC) is possible. But in a case where the service environment cannot support the asynchronous transfer mode (ATM), and can only support the transmission control protocol/Internet protocol (TCP/IP), the technical implementation of the digital storage media-command and control (DSM-CC) is difficult.

Since the session control protocol and the channel change protocol should be implemented on the different protocol stacks, an additional manipulation or conversion is required in order to have compatibility between those two protocols. A message that is transmitted through the channel change protocol must be received at a first destination and then manipulated or converted, so that the contents of that message can then be transmitted to a second destination through the session control protocol.

The repeated changing of TCP/IP packets to ATM packets, and the repeated changing of ATM packets to TCP/IP packets would be necessary in that arrangement. The set top box unit that is the subject of requesting of the channel change, for the most part, has no asynchronous transfer mode (ATM) adaptation layer (AAL) mounted thereon, and it is necessary to develop a modified technique.

Figure 3:
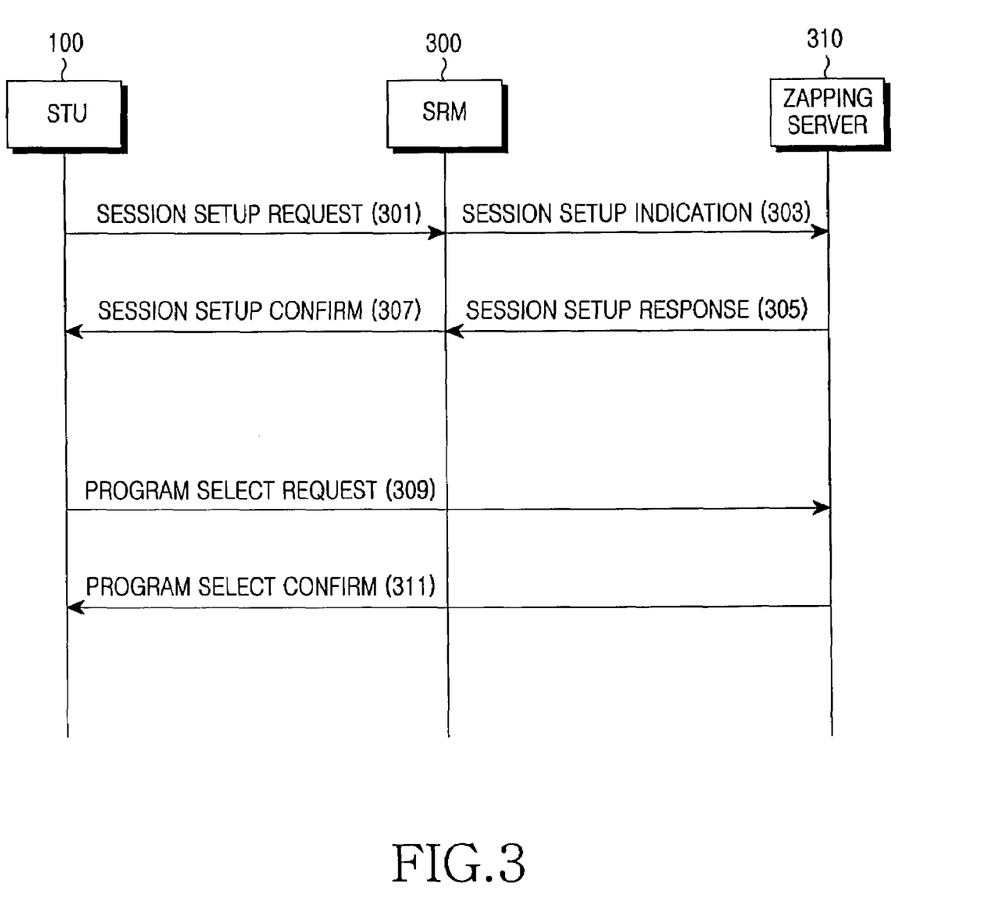
FIG. 3 is a view illustrating a message flow between a broadcasting server and a subscriber according to an exemplary technique.

FIG. 3 is a view illustrating a message flow between a broadcasting server and a subscriber according to an exemplary technique. The digital storage media-command and control (DSM-CC) standard defines a session resource manager (SRM) 300 that is a terminating set between the channel change protocol (CCP) server 310 and the set top box unit (STU) 100. The channel change protocol (CCP) server 310 may also be referred to as zapper server 310. The channel change protocol (CCP) server indicates a portion corresponding to a server in a channel change protocol. The channel change protocol (CCP) server program is mounted on one of optical line termination (OLT) or optical network unit (ONU). Accordingly, the channel change protocol (CCP) server 310 in FIG. 3 does not appear in FIG. 1.

The session resource manager (SRM) 300 converts messages that are transmitted through the session control protocol to become messages to be transmitted through the channel change protocol. The session resource manager (SRM) 300 converts messages that are transmitted through the channel change protocol to become messages to be transmitted through the session control protocol. The channel change protocol and the session control protocol operate on different protocol stacks.

If the digital storage media-command and control (DSM-CC) standard is applied without modification, it causes inconvenience and inefficiency such as putting the session onto the Internet protocol (IP), the sending of the channel on the asynchronous transfer mode adaption layer 5 and then on the Internet protocol network in a network interface unit (NIU) 110, and the sending of a confirmation message in reverse order.

Hereinafter, the channel changing method in a digital broadcasting service according to the present invention will be described with reference to the accompanying drawings. In the following description of the present invention, a detailed description of known functions and configurations incorporated herein will be omitted when it may make the subject matter of the present invention rather unclear.

The present invention enables a high-quality broadcasting service by using a transmission control protocol/Internet protocol (TCP/IP) network that is most universal and can be easily constructed. The present invention implements the session control and the channel change on the same protocol stack, and at this time, the session control and the channel change are performed based on the transmission control protocol/Internet protocol (TCP/IP) protocol stack that is most universal and rich in extension possibility.

The present invention performs both the session control and the channel control on the same protocol stack using the point that protocol message discriminators of the standard digital storage media-command and control (DSM-CC) are different from one another.

First, the digital storage media-command and control (DSM-CC) message is composed of a header and a payload. Especially, the header of the digital storage media-command and control (DSM-CC) message is composed of a protocol discriminator, a DSM-CC type, and a message discriminator. That is, message identifier (ID) defined in Internation Standards Organization/International Electrotechnical Commission (ISO/IEC) 13818-6. Also, according to the digital storage media-command and control (DSM-CC) type, the session is defined to be a user to network type (U-N type), and the channel is defined to be a channel change protocol (CCP) type. Since the session and the channel are discriminated by different types as described above, it is possible to discriminate the session and the channel even if they are included in the same digital storage media-command and control (DSM-CC) header for transmission.

The constituent elements of broadcasting on demand (BOD) may include a high-speed basic network, a set top box unit (STU), an access network for connecting the high-speed basic network with the set top box unit (STU), and a multimedia database management system (DBMS). The high-speed basic network can be constructed using fiber distributed data interface (FDDI), asynchronous transfer mode (ATM), distributed queue dual bus (DQDB), high-speed local area network (LAN), or other means, and transmits data of a large capacity. The access network used may be an asymmetric digital subscriber line (ADSL) using a telephone line, very-high-bit-rate digital subscriber line (VDSL), cable television (TV) network, or other means.

Hereinafter, the construction of the present invention will be explained in detail with reference to FIG. 1, which shows the construction for providing a digital broadcasting service. As shown in FIG. 1, the network incorporating the present invention includes a set top box unit (STU) 100, a network interface unit (NIU) 110, an optical network unit (ONU) 120, an optical line termination (OLT) 130, a headend 140, a router 150, and the Internet 160. The headend 140 of FIG. 1 corresponds to a broadcasting server such as a video server as described above. Hereinafter, the broadcasting server is called the "headend." Typically, the headend 140, the optical line termination (OLT) 130, and the optical network unit (ONU) 120 are connected together by an optical cable. The access network that includes the network interface unit (NIU) 110 and the set top box unit (STU) 100 can be connected using an Ethernet, an xDSL (that is, ADSL, VDSL, or other DSL), a cable modem, and a fiber to the home (FTTH), for example.

Also, the access network is connected to other networks through the router 150. In FIG. 1, the Internet 160 is indicated and explained as the access network. However, the Internet 160 is just a representative example of a network, and the present invention is not limited thereto. The FIG. 1 shows the headend 140 directly connected to the optical line termination (OLT) 130, but the headend 140 may be connected to the router 150 via the Internet 160. Other configurations are possible.

Also, the set top box unit (STU) 100 of FIG. 1 serves to restore and reproduce digital images and audio data compressed by and transmitted from the headend 140, and to transmit a user's request to the headend 140. It is required that the headend 140 is provided with a large-capacity database for storing the video and audio data so as to perform a real-time search. The headend 140 transmits desired broadcasting data to the set top box unit (STU) 100 according to the signal received from the set top box unit (STU) 100.

The network interface unit (NIU) 110 is a device to enable the set top box unit (STU) 100 to connect with the network. The optical network unit (ONU) 120 converts an optical signal to electric signal, and vice versa. That is, the optical network unit (ONU) 120 converts the electric signal received from the network interface unit (NIU) 110 into the optical signal to transmit the converted optical signal to the optical line termination (OLT) 130, and converts the optical signal received from the optical line termination (OLT) 130 into the electric signal to transmit the converted electric signal to the network interface unit (NIU) 110.

Due to the data transmission/reception speed limit of the very-high-bit-rate digital subscriber line (VDSL) and other means, the broadcasting data of all the channels cannot get into home through the the very-high-bit-rate digital subscriber line (VDSL) line. Thus, a channel change server 310 is installed between the headend 140 and the subscriber's device (STU 100) to transmit all the broadcasting channel data between the headend 140 and the channel change server 310, and between the channel change server 310 and the subscriber's device is transmitted only the broadcasting data of the channel requested by the user. The channel change server 310 is also known as a zapper server 310 and a channel changing server 310 and a server 310.

The subscriber's device, that is, the set top box unit (STU) 100, receives the broadcasts through the data transmission/reception because of the channel change protocol (CCP) server 310. To provide the service as described above, a rule for channel selection or channel change, which is called a channel change protocol (CCP), is provided between the subscriber's device 100 and the channel change protocol (CCP) server 310. Generally, the optical line termination (OLT) 130 or the optical network unit (ONU) 120 take charge of the channel change protocol (CCP) server 310.

In the present invention, the channel change is performed in the same protocol stack as the session control signal. For this, the present invention proposes a protocol stack as shown in FIG. 4.

Figure 4:
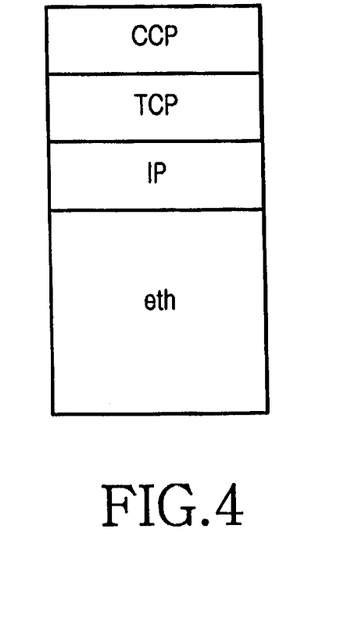
FIG. 4 is a view illustrating a channel change protocol stack, in accordance with the principles of the present invention.

FIG. 4 is a view illustrating a channel change protocol stack, in accordance with the principles of the present invention. As shown in FIG. 4, according to the channel change protocol stack according to the present invention, the channel protocol is also performed with the transmission control protocol/Internet protocol (TCP/IP), not on asynchronous transfer mode (ATM). Thus, the channel change protocol is directly transferred from the network interface unit (NIU) 110 to the headend 140 by routing without any separate manipulation. At this time, the channel change message has a different type from the session control message, and they can be discriminated from each other even on the same protocol stack.

Figure 5:
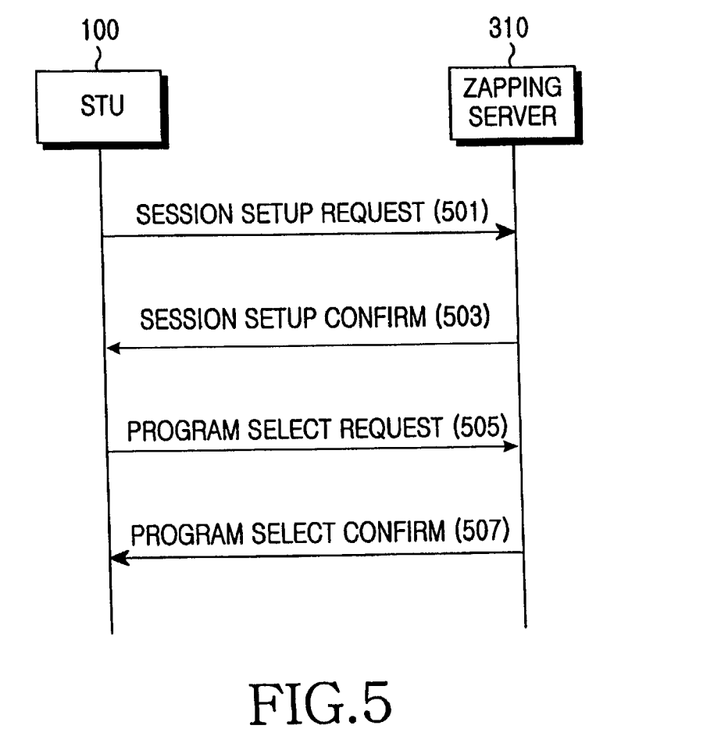
FIG. 5 is a message flow between a broadcasting server and a subscriber, in accordance with the principles of the present invention.

Hereinafter, the operation of the present invention will be explained with reference to FIG. 5. The FIG. 5 is a message flow between a broadcasting server and a subscriber, in accordance with the principles of the present invention.

During the initial operation, the set top box unit (STU) 100 generates a socket for a session setup, and attempts a connection. If the connection is made, the set top box unit (STU) 100 generates and transmits a session setup request message 501 to the channel change protocol (CCP) server 310. In contrast with the exemplary technique shown in FIG. 3, the session setup message 501 is directly transferred to the channel change protocol (CCP) server 310 through the network interface unit (NIU) 110 without any other manipulation such as a conversion. The channel change protocol (CCP) server 310 that received the session setup request through the session setup request message 501 sets the session, and transmits to the set top box unit (STU) 100 a session setup confirmation message 503 for confirming the session setup request message. The features described above regarding FIG. 5 are part of a session setup procedure.

The set top box unit (STU) 100 that received the session setup confirmation message 503 transmits a program selection request message 505 to the channel change protocol (CCP) server 310. The channel change protocol (CCP) server 310 transmits to the set top box unit (STU) 100 a program selection confirmation message 507 that includes information on a channel requested through the program selection request message 505, and then transmits broadcasting data of the corresponding channel to the set top box unit (STU) 100.

Thereafter, if the user intends to change the channel, the set top box unit (STU) 100 transmits only the program selection request message 505 to the channel change protocol (CCP) server 310, and the channel change protocol (CCP) server 310 transmits only the program selection confirmation message 507 to the set top box unit (STU) 100 in response to the program selection request message. Meanwhile, in case of the session setup, the set top box unit (STU) 100 transmits to the channel change protocol (CCP) server 310 the information on the channel last transmitted and stored in the set top box unit (STU) 100, and receives the broadcasting data through the corresponding channel before the user selects the channel.

Finally, the specified examples such as transmission types, Internet, etc., as described above are only for the understanding of the present invention, but it should be noted that the present invention is not limited to those examples. The program selection request message 505 can also be referred to as a channel change request message. The program selection confirmation message 507 can also be referred to as a channel change confirmation message.

As described above, according to the present invention, the session control and the channel control are performed in the same protocol stack, and the consistency is maintained with the advantages of easy implementation and easy application to the existing transmission control protocol/Internet protocol (TCP/IP) environment. Also, since the present invention uses the most universal transmission control protocol/Internet protocol (TCP/IP), it can be applied to a gigabit Ethernet and any terabit Ethernet to be developed in the future.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. An apparatus for changing channels in a digital broadcasting service, the apparatus comprising:
  a set top box unit being provided with a channel change protocol configured on a transmission control protocol/Internet protocol layer, said set top box unit transmitting a session setup request message configured on the transmission control protocol/Internet protocol layer the session setup requesting message for setting up a session, and said set top box transmitting a channel change request message through the channel change protocol, and the channel change request message requesting broadcasting data for a new channel; and
  a channel change server directly receiving the session setup request message and the channel change request message through the channel change protocol, directly transmitting a session setup confirmation message and a channel change confirmation message through the channel change protocol in response to the received session setup request message and channel change request message, said set top box unit directly receiving the session setup confirmation message and the channel change confirmation message from said channel change server through the channel change protocol, said channel change server directly transmitting the broadcasting data of the new channel to said set top box unit through the channel change protocol.

2. The apparatus of claim 1, in case of the session setup, said set top box unit transmitting information carried by the channel to said channel change server through the channel change protocol, the information carried by the channel being last transmitted and stored in the set top box unit, and receiving the broadcasting data of the corresponding channel before the user selects the new channel.

3. The apparatus of claim 1, the channel change confirmation message including new channel information in dependence upon the channel change request message.

4. The apparatus of claim 1, the channel change request message being inputted at said set top box unit.

5. The apparatus of claim 1, said setting up of the session being performed before the channel change request message is transmitted and including a generation of a socket from the set top box unit.

6. The apparatus of claim 1, said set top box unit generating a socket and attempting to establish a connection with said channel change server, said set top box unit transmitting a session setup request message to said channel change server through the channel change protocol when a connection with said channel change server is initially established, said channel change server receiving the session setup request message from said set top box unit through the channel change protocol, said channel change server transmitting a session setup confirmation message to said set top box unit through the channel change protocol in response to the session setup request message, said set top box unit receiving the session setup confirmation message from said channel change server through the channel change protocol.

7. The apparatus of claim 6, the requested broadcasting data of the new channel transmitted from the channel change server including at least one selected from among digital video data and digital audio data.

8. A method for changing channels in a digital broadcasting service, the method comprising:
- directly transmitting a channel change request message from a set top box unit to a channel change server through a channel change protocol, the channel change protocol being configured on a transmission control protocol/Internet protocol layer, the channel change request message requesting broadcasting data of a new channel;
- directly receiving the channel change request message at the channel change server through the channel change protocol;
- directly transmitting a channel change confirmation message from the channel change server to the set top box unit in response to the received channel change request message; and
- directly transmitting the requested broadcasting data of the new channel from the channel change server.

9. The method of claim 8, the channel change confirmation message being transmitted from the channel change server to the set top box unit through the channel change protocol, the requested broadcasting data of the new channel being received from the channel change server through the channel change protocol.

10. The method of claim 8, further comprising:
- before receiving the broadcasting data of the new channel at the set top box unit, transmitting information carried by the channel from the set top box unit to the channel change server through the channel change protocol, the information carried by the channel being last transmitted and stored in the set top box unit; and
- receiving broadcasting data of the previous corresponding channel at the set top box unit through the channel change protocol before receiving the broadcasting data of the new channel from the channel change server.

11. The method of claim 8, the channel change confirmation message including new channel information in dependence upon the channel change request message.

12. The method of claim 8, the channel change request message being inputted at the set top box unit.

13. The method of claim 8, further comprising:
- before the set top box unit performs said transmitting of the channel change request message, setting up a session, said setting up of the session including establishing an initial connection between the set top box unit and the channel change server, said setting up of the session including generating a socket from the set top box unit.

14. The method of claim 8, further comprising:
- generating a socket and attempting to establish a connection between the set top box unit and the channel change server;
- when the connection between the set top box unit and the channel change server is established, transmitting a session setup request message from the set top box unit to the channel change server through the channel change protocol;
- receiving the session setup request message at the channel change server through the channel change protocol;
- transmitting a session setup confirmation message from the channel change server to the set top box unit through the channel change protocol in response to the session setup request message; and
- receiving the session setup confirmation message at the set top box unit though the channel change protocol.

15. The method of claim 14, the requested broadcasting data of the new channel transmitted from the channel change server including at least one selected from among digital video data and digital audio data.

16. The method of claim 15, said transmitting of the channel change request message being performed after said receiving of the session setup confirmation message transmitted from the channel change server.

17. The method of claim 8, the requested broadcasting data of the new channel transmitted from the channel change server including at least one selected from among digital video data and digital audio data.

18. A method for changing channels in a digital broadcasting service, the method comprising:
- directly transmitting a channel change request message from an interface unit to a channel change server through a channel change protocol, the channel change protocol being configured on a transmission control protocol/Internet protocol layer, the channel change request message requesting broadcasting data of a different channel;
- directly receiving the channel change request message at the channel change server through the channel change protocol;
- directly transmitting a channel change confirmation message from the channel change server to the interface unit through the channel change protocol in response to the received channel change request message; and
- directly transmitting the requested broadcasting data of the different channel from the channel change server to the interface unit through the channel change protocol, the requested broadcasting data of the different channel transmitted from the channel change server including at least one selected from among digital video data and digital audio data.

19. The method of claim 18, further comprising:
- before receiving the broadcasting data of the different channel at the interface unit, transmitting information on channel from the interface unit to the channel change server through the channel change protocol, the information on the channel being last transmitted and stored in the set top box unit; and
- receiving broadcasting data of the corresponding channel at the interface unit through the channel change protocol before receiving the broadcasting data of the different channel from the channel change server.

20. The method of claim 19, the channel change request message being inputted at the interface unit.

21. The method of claim 19, further comprising:
- before the interface unit performs said transmitting of the channel change request message, setting up a session, said setting up of the session including establishing an initial connection between the interface unit and the channel change server, said setting up of the session including generating a socket from the interface unit.

22. The method of claim 21, further comprising:
- when the connection between the interface unit and the channel change server is established, transmitting a session setup request message from the interface unit to the channel change server through the channel change protocol;
- receiving the session setup request message at the channel change server through the channel change protocol;
- transmitting a session setup confirmation message from the channel change server to the interface unit through the channel change protocol in response to the session setup request message; and
- receiving the session setup confirmation message at the interface unit through the channel change protocol.

23. An apparatus for changing channels in a digital broadcasting service, the apparatus comprising:

a set top box unit being provided with a channel change protocol configured on a transmission control protocol/Internet protocol layer, said set top box unit transmitting a session setup request message configured on the transmission control protocol/Internet protocol layer the session setup requesting message for setting up a session, and said set top box transmitting a channel change request message through the channel change protocol, and the channel change request message requesting broadcasting data for a new channel; and a channel change server directly receiving, from the set top box, the session setup request message and the channel change request message through the channel change protocol, directly transmitting, to the set top box, a session setup confirmation message and a channel change confirmation message through the channel change protocol in response to the received session setup request message and channel change request message, said set top box unit directly receiving the session setup confirmation message and the channel change confirmation message from said channel change server through the channel change protocol, said channel change server directly transmitting the broadcasting data of the new channel to said set top box unit through the channel change protocol.

24. An apparatus for changing channels in a digital broadcasting service, the apparatus comprising:

a set top box unit being provided with a channel change protocol configured on a transmission control protocol/Internet protocol layer, said set top box unit transmitting a session setup request message configured on the transmission control protocol/Internet protocol layer the session setup requesting message for setting up a session, and said set top box transmitting a channel change request message through the channel change protocol, and the channel change request message requesting broadcasting data for a new channel, with the channel change protocol configured with one of a channel change application layer and a session control application layer; and a channel change server directly receiving, from the set top box, the session setup request message and the channel change request message through the channel change protocol, directly transmitting, to the set top box, a session setup confirmation message and a channel change confirmation message through the channel change protocol in response to the received session setup request message and channel change request message, said set top box unit directly receiving the session setup confirmation message and the channel change confirmation message from said channel change server through the channel change protocol, said channel change server directly transmitting the broadcasting data of the new channel to said set top box unit through the channel change protocol.

* * * * *